United States Patent Office 2,993,112
Patented July 18, 1961

2,993,112
METHOD FOR WELDING TUNGSTEN
Alexander L. Feild, Jr., Bridgeville, Pa., assignor to Universal-Cyclops Steel Corporation, Pittsburgh, Pa., a corporation of Pennsylvania
No Drawing. Filed Nov. 10, 1959, Ser. No. 851,944
3 Claims. (Cl. 219—118)

This invention relates to a method of welding tungsten whereby strong ductile welds result.

In the methods of welding tungsten proposed heretofore, a weld pool of molten metal is produced and then permitted to solidify to form a joint between two tungsten parts. Characteristically the resulting joints are brittle because of contamination of the weld by gaseous interstitial impurities, such as nitrogen and oxygen, or because of the large grain size and small grain boundary area in the weld joint in which impurities tend to concentrate. As is evident, contamination can be minimized by giving careful attention to maintaining a high purity welding atmosphere. Brittle welds due to large grain size and the like, however, are inherent in the material being welded and no known welding process provides any way of controlling this phenomenon.

It is therefore a primary object of the present invention to provide a process for producing strong ductile welds in tungsten metal by an easily practiced method that is readily reproducible.

I have discovered, and it is on this discovery that the invention is largely predicated, that strong ductile fusion arc welded joints can be obtained in tungsten metal by including a quantity of titanium in the area to be welded. Thereafter as the weld pool solidifies, the parts of tungsten are joined by a tungsten-titanium alloy characterized by a fine grain structure, high mechanical strength and ductility, as compared with welds produced heretofore.

Moreover, it has been found that heat induced mechanical stresses do not occur in joints produced in accordance with my invention and the resulting joint parts may be handled without danger of brittle fracture of the welds.

The titanium that is used in accordance with this invention can be considered as a filler metal. It is used in an amount, generally, to result in a 10 to 50 weight percent concentration of titanium in the total molten pool produced in the welding operation. This filler metal can be used in any form desired; however, it has been found convenient to use it in the form of wire, emplaced contour wire or as a sheet wafer maintained between the parts to be welded.

The invention will be described further, in detail, in conjunction with a specific example. It should be understood that the details disclosed are given by way of illustration and not by way of limitation.

Two 4 inch lengths of ⅝ inch diameter sintered and swaged tungsten bar of about 97 percent theoretical density were placed in a jig in such a manner that parallel flat end faces were mated in position so that a conventional butt weld could be made. A thin disc, 0.010 inch thick, of pure titanium sheet was inserted between the ends of the two tungsten bars where they were mated. This assembly was then placed in a welding chamber. The chamber was evacuated and then was backfilled with an inert gas, such as argon or helium, to atmospheric pressure. Welding was accomplished with a water cooled electrode having a ¼ inch diameter tungsten tip. The electrode assembly was adapted to permit free hand manipulation of the electrode so that an arc could be produced at any given location upon contacting the work piece. The electrode served as the negative pole of the circuit and the work piece as the positive pole. D.C. current of 500 amperes at 25 volts was used.

In welding the bars, the arc length was adjusted to give maximum penetration with a minimum pool diameter. For the specific size and shape of materials described above, the optimum arc gap was found to be about ¼ inch. The arc was struck on the sides of the intended weld area and the tungsten gradually heated to the melting point. When the tungsten was sufficiently heated and a pool of about ⅜ inch in diameter and ⅛ inch deep was formed (in 2 to 3 minutes), the titanium was gradually mixed into it by manipulation of the electrode. Substantially simultaneously, the power was gradually reduced to 300 amperes because the melting point of the pool was lowered appreciably by the titanium addition. After mixing for a short period to insure homogeneity, the power was turned off and the weld pool was permitted to solidify and then cool to room temperature.

The welded bars were then removed from the furnace and from the jig. Visual inspection showed that the weld area was smooth and bright indicating lack of contamination during the welding operation. The welded pieces were then placed in a vise so that one of the joined lengths and the weld area projected beyond the end of the vise. The ductility of the weld was tested by striking the extended tungsten bar with a hammer. Several blows of the hammer were necessary to initiate fracture, and it was noted that bend ductility was evidenced before fracture occurred. The fractured area showed a fine grain size.

Similar runs were made changing the foregoing procedure only by omitting the titanium disc. Hence, the resulting weld joint was of the same composition as the tungsten bars. In testing such joints in the same manner as just described, it was found that the joint failed on the first blow of the hammer, thereby demonstrating its extreme brittleness. Examination of the fractured area in this instance showed a brittle, rather large grained fracture.

From the foregoing it is apparent that my invention provides an easily practiced system for producing strong ductile fusion arc weld joints in tungsten metal. It is also evident that the decreased melting point of the fusion area brought about in accordance with my invention results in a savings in power consumption for lower welding currents can now be used to produce satisfactory joints in tungsten. Moreover, the lower melting point of the pool increases the ease of joining tungsten, which has heretofore been limited by its extreme melting point.

Variations can be made in the process of this invention from the example given without departing from its scope. For example, where it is desired to control exactly the composition of the weld material, this can be readily accomplished by using an appropriate filler rod which is melted in place to provide substantially all of the pool metal. Alternatively, a consumable electrode of the proper tungsten-titanium composition can be used to provide close control of the weld metal composition. Similarly, different arc gaps and pool characteristics can be applied depending on the nature of the joint being produced.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:
1. A method of welding tungsten comprising maintaining areas of at least two tungsten parts to be joined in contact with one another, producing between those two parts a pool of tungsten containing 10 to 50 weight percent of titanium, and then permitting said pool to solidify and thereby join the tungsten parts.

2. A method in accordance with claim 1 in which said pool metal is supplied by a consumable electrode composed of tungsten and 10 to 50 weight percent of titanium, and maintained in the weld area.

3. A method of welding tungsten comprising maintaining areas of at least two tungsten parts to be welded in contact with one another to define a weld area, placing titanium in said weld area, then melting tungsten from said parts into said area to produce a weld pool, mixing said titanium into said pool, and then cooling and solidifying said weld pool thereby to join said tungsten parts together.

References Cited in the file of this patent

UNITED STATES PATENTS 2,839,819  Platte _____ June 24, 1958